United States Patent
Igarashi et al.

(10) Patent No.: US 11,389,878 B2
(45) Date of Patent: Jul. 19, 2022

(54) TiN-BASED SINTERED BODY AND CUTTING TOOL MADE OF TiN-BASED SINTERED BODY

(71) Applicant: MITSUBISHI MATERIALS CORPORATION, Tokyo (JP)

(72) Inventors: Makoto Igarashi, Naka (JP); Kazutaka Fujiwara, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 16/968,798

(22) PCT Filed: Feb. 6, 2019

(86) PCT No.: PCT/JP2019/004201
§ 371 (c)(1),
(2) Date: Aug. 10, 2020

(87) PCT Pub. No.: WO2019/159781
PCT Pub. Date: Aug. 22, 2019

(65) Prior Publication Data
US 2020/0398348 A1 Dec. 24, 2020

(30) Foreign Application Priority Data

Feb. 13, 2018 (JP) .............................. JP2018-022926
Dec. 25, 2018 (JP) .............................. JP2018-241104

(51) Int. Cl.
*B23B 27/14* (2006.01)
*B23C 5/16* (2006.01)
(Continued)

(52) U.S. Cl.
CPC ............... *B23B 27/14* (2013.01); *B23C 5/16* (2013.01); *C22C 1/055* (2013.01); *C22C 29/16* (2013.01); *C22C 33/02* (2013.01)

(58) Field of Classification Search
CPC .......... B23B 27/14; B23B 27/148; C23C 5/16
(Continued)

(56) References Cited

U.S. PATENT DOCUMENTS 4,065,301 A * 12/1977 Tanaka .................... C22C 29/00
                                                                  419/13
5,666,636 A    9/1997 Park et al.
6,024,776 A *  2/2000 Heinrich ............... C22C 29/005
                                                                  75/238

FOREIGN PATENT DOCUMENTS

JP  49-001364 B  1/1974
JP  50-017412 A  2/1975
(Continued)

OTHER PUBLICATIONS

International Search Report dated Apr. 23, 2019 for the corresponding PCT International Application No. PCT/JP2019/004201.
(Continued)

*Primary Examiner* — Archene A Turner
(74) *Attorney, Agent, or Firm* — Leason Ellis LLP

(57) ABSTRACT

Disclosed is a TiN-based sintered body and a cutting tool made of the TiN-based sintered body, which has 70 to 94 area % of a TiN phase, 1 to 25 area % of a $Mo_2C$ phase, and a remainder including a binder phase. The binder phase contains Fe and Ni whose total area ratio is 5 to 15 area %, and an amount of Ni to a total amount of Fe and Ni is 15 to 35 mass %. When an X-ray diffraction profile is measured in the cross section of the TiN-based sintered body, the diffraction peaks of TiN, $Mo_2C$ and Fe—Ni having an fcc structure are present, but the diffraction peaks of Fe—Ni having a bcc structure, a $Fe_3Mo_3C$ phase, and a $Fe_3Mo_3N$ phase are absent. The lattice constant of the TiN is 4.235 to 4.245 Å, and that of the Fe—Ni having an fcc structure is 3.58 to 3.62 Å.

2 Claims, 1 Drawing Sheet

(51) Int. Cl.
   *C22C 1/05* (2006.01)
   *C22C 29/16* (2006.01)
   *C22C 33/02* (2006.01)

(58) Field of Classification Search
   USPC .................................................. 51/307, 309
   See application file for complete search history.

(56) References Cited

FOREIGN PATENT DOCUMENTS

| | | |
|---|---|---|
| JP | 51-065008 A | 6/1976 |
| JP | 51-071809 A | 6/1976 |
| JP | 63-109139 A | 5/1988 |
| JP | 08-176695 A | 7/1996 |

OTHER PUBLICATIONS

Kaidash O. N. et al. "Corrosion Resistance of Cermets Based On Titanium Nitride", Soviet Powder Metallurgy and Metal Ceramics, Consultants Bureau, Jan. 1, 1991, pp. 69-73, New York, NY, US, vol. 1, No. 337, XP009037366, ISSN: 0038-5735, DOI: 10.1007/BF00793405.

European Search Report dated Oct. 13, 2021 for the corresponding European Patent Application No. 19754323.4.

* cited by examiner

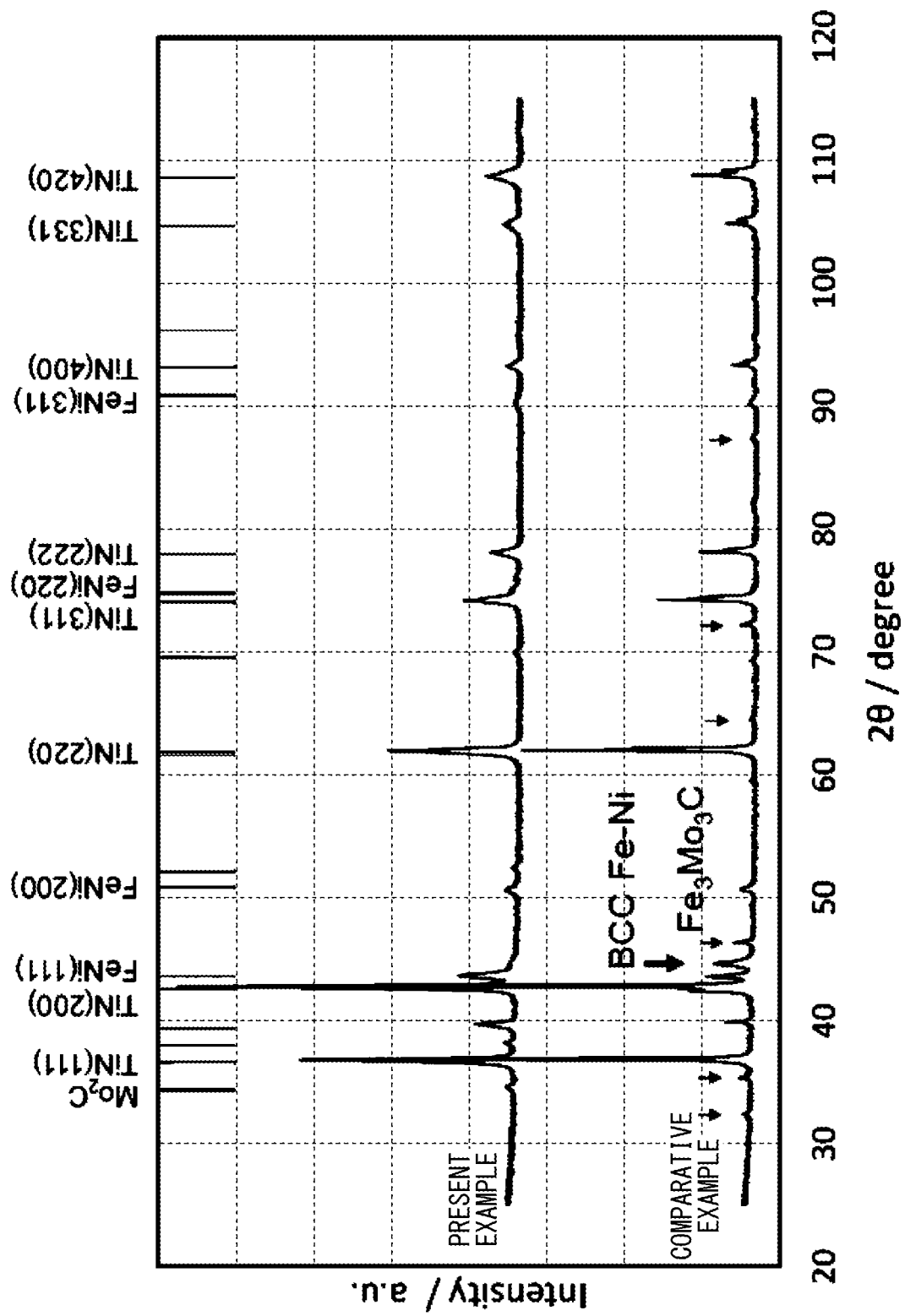

TIN-BASED SINTERED BODY AND CUTTING TOOL MADE OF TIN-BASED SINTERED BODY

CROSS-REFERENCE TO RELATED PATENT APPLICATIONS

This application is a U.S. National Phase Application under 35 U.S.C. § 371 of International Patent Application No. PCT/JP2019/004201 filed on Feb. 6, 2019 and claims the benefit of priority to Japanese Patent Applications No. 2018-022926 filed on Feb. 13, 2018 and No. 2018-241104 filed on Dec. 25, 2018, all of which are incorporated herein by reference in their entirety. The International Application was published in Japanese on Aug. 22, 2019 as International Publication No. WO/2019/159781 under PCT Article 21(2).

FIELD OF THE INVENTION

The present invention relates to a TiN-based sintered body that is excellent in terms of hardness and toughness, and relates to a cutting tool made of a TiN-based sintered body that includes the TiN-based sintered body as the body and is excellent in terms of abnormal damage resistance against chipping and fracturing and wear resistance.

BACKGROUND OF THE INVENTION

In the related art, as cutting tools, a cutting tool made of a WC-based cemented carbide, a cutting tool made of a TiCN-based cermet, a cutting tool made of a TiC-based sintered alloy, a cutting tool made of a TiN-based sintered alloy, and the like are known.

Among these cutting tools, a cutting tool made of a TiC-based sintered body has excellent wear resistance; however, compared with other cutting tools, has significantly poor toughness, is susceptible to thermal shock, and is also easily fractured. Therefore, the cutting tool made of a TiC-based sintered body is mainly used in high-speed finish cutting processes.

In addition, the cutting tool made of a TiCN-based cermet has a low affinity to steel and is excellent in terms of wear resistance and finish surface roughness; however, conversely, is not satisfactory with toughness.

The cutting tool made of a WC-based cemented carbide has excellent toughness, but cannot be said to have sufficient wear resistance. Furthermore, as the alloy components, W and Co, which are rare metals, are used, and thus it is necessary to reduce the amount of W used and the amount of Co used in order to reduce costs.

Therefore, several proposals have been thus far made in order to provide tool materials that are excellent in terms of toughness and wear resistance.

For example, as a TiC-based sintered alloy, proposed is a TiC-based sintered alloy for a cutting tool component that is a sintered alloy, as described in Japanese Unexamined Patent Application, First Publication No. S63-109139, containing 5 to 25 weight % of a binder phase containing Ni and/or Co as the main component, a hard phase containing 20 to 65 weight % of titanium carbide, 18 to 40 weight % of titanium nitride, and 15 to 40 weight % of at least one carbide of a metal belonging to Group VIa of the periodic table as the reminder, and inevitable impurities. The hard phase has an average grain size of 1.0 μm to 2.0 μm, the hard phase having a grain size of 0.5 μm or less accounts for 1 to 10 area % of the total hard phase, and the binder phase has a lattice constant of 3.56 Å to 3.61 Å. A cutting tool made of the TiC-based sintered alloy is described to improve on the thermal shock resistance, the wear resistance, the thermal plastic deformation resistance, and the fracture resistance.

In addition, regarding a TiN-based sintered alloy, for example, Japanese Examined Patent Application, Second Publication No. S49-1364 proposes a sintered hard alloy for a cutting tool containing a hard phase and a bonding metal. The alloy contains 65 to 97 weight % of the hard phase and 3 to 35 weight % of the bonding metal, the hard phase is formed of a nitride and/or a carbonitride having an oxygen content of 0.15% or less, and the bonding metal, which bonds the hard phase, is an alloy of at least one iron-group metal and one chromium-group metal. This sintered hard alloy is described to have high toughness.

In addition, in Example 1 showing a concrete example, it is described that a sintered hard alloy obtained by sintering 90 weight % (the oxygen content in TiN is 0.05%) of TiN as a hard phase component, and 10 weight % of a mixture of Ni and Mo (80:20) in nitrogen atmosphere at a pressure of 350 mmHg and approximately 1450° C. exhibits a Vickers hardness (load: 3 kg) of approximately 1500 and a bending fracture strength of 80 to 90 kg/mm$^2$.

Furthermore, for example, Japanese Unexamined Patent Application, First Publication No. S51-71809 proposes a TiN-based sintered alloy obtained by adding and mixing carbon powder in an amount of 0.2 to 6.8 parts by weight with respect to 100 parts by weight of TiN, to 100 parts by weight of the sintered alloy raw material powder composed mainly of TiN, then molding and sintering. The sintered alloy raw material powder contains 65 to 95 weight % of TiN, 2 to 20 weight % of Mo and/or $Mo_2C$, and 3 to 15 weight % of an iron-group metal.

It is described that, with this TiN-based sintered alloy, the carbon powder is precipitated as TiC on the surfaces of TiN particles during sintering, and an improvement in the wettability between the TiN particles and bonding metals (Ni and Co) enhances the durability (Flank wear and plastic deformation resistance) of cutting tools particularly in the high-speed continuous or intermittent cutting of cast iron.

Technical Problem

In recent years, there has been a strong demand for labor saving, energy saving, speed-up, efficiency improvements, and cost reduction in the technical field of cutting processes, and remarkable achievements have been made in terms of the performance improvement in cutting tools. On the other hand, the operating conditions of cutting tools have become severer, and there have been demands not only for additional improvements in tool performance but also for the extension of tool service lives. In addition, the development of materials capable of meeting such demands has been desired.

As described above, the WC-based cemented carbide has excellent toughness, but cannot be said to have sufficient wear resistance. Furthermore, the WC-based cemented carbide is an expensive tool material, because W and Co of rare metals are used as the alloy components, and it is a issue for reducing costs to reduce the amount of W and Co In addition, the TiCN-based cermet is excellent in terms of hardness and wear resistance, but is not satisfactory with toughness. Therefore, in a case where the TiCN-based cermet is used for cutting tools, there is a problem in that chipping, fracturing, or the like easily occurs, and this damage shortens the service lives of the tools.

Therefore, as a material for a cutting tool, there is a desire for a cutting tool material that is excellent in terms of both toughness and hardness and exhibits excellent cutting performance over long-term use while preventing the occurrence of abnormal damage such as chipping or fracturing.

SUMMARY OF THE INVENTION

Solution to Problem

From the above-described viewpoint, the present inventors carried out intensive studies regarding a cutting tool material that has not only toughness comparable to that of WC cemented carbides but also hardness and wear resistance comparable to that of TiCN-based cermets, and furthermore, eliminates the need for the use of W and Co, which are rare metals, and obtained knowledge as described below.

First, the present inventors investigated the causes for shortening tool service lives of cutting tools made of a TiN-based sintered body of the related art. As a result, the present inventors found that a decrease in the strength of the binder phase or the like is a major cause for shortening the tool services lives. The decrease in the strength of the binder phase is attributed to the following facts.

(i) The wettability between TiN particles and the binder phase is poor, and the TiN particles and the binder phase are not easily sintered. Therefore, in the TiN-based sintered body, fine pores are likely to be formed, and the degree of densification is low.

(ii) In a case where a binder phase containing Fe as the main component is used, a Fe-based binder phase having a bcc structure, which is poor in terms of toughness and hardness, is preferentially formed.

(iii) A hetero-phase formed of a composite carbide such as a $Ni_3Mo_3C$ phase or a $Fe_3Mo_3C$ phase, a composite nitride such as a $Fe_3Mo_3N$ phase, iron carbide, or the like is formed.

As a result, the present inventors were able to produce a TiN-based sintered body that was excellent in terms of both toughness and hardness by determining the optimal component composition for improving the wettability between the TiN particles and the binder phase and enhancing the sinterability in the production of the TiN-based sintered body, determining the optimal component composition of binder phase-forming components for increasing the strength of the binder phase, and furthermore, preventing the formation of a hetero-phase in the binder phase.

In addition, the present inventors used this TiN-based sintered body, which was excellent in terms of both toughness and hardness, for, for example, cutting tools for the continuous cutting or intermittent cutting processes of carbon steel, alloy steel, and the like, and consequently found that the cutting tools had excellent abnormal damage resistance almost equivalent or superior to that of cutting tools made of WC-based cemented carbide of the related art, had wear resistance almost equivalent to that of cutting tools made of a TiCN-based cermet of the related art, and exhibited excellent cutting performance over long-term use.

The present invention has been made based on the above-described knowledge and is "(1) A TiN-based sintered body having a sintered structure containing 70 to 94 area % of a TiN phase, and 1 to 25 area % of a $Mo_2C$ phase, and a remainder including a binder phase, in which (a) components of the binder phase include Fe and Ni, a total area ratio of Fe and Ni is 5 to 15 area %, and the a content ratio of Ni with respect to a total amount of Fe and Ni is 15 to 35 mass %, (b) in a case where an X-ray diffraction profile is measured in a cross section of the TiN-based sintered body using an X-ray diffractometer, at least diffraction peaks of TiN, $Mo_2C$, and Fe—Ni having an fcc structure are present, but diffraction peaks of Fe—Ni having a bcc structure, a $Fe_3Mo_3C$ phase of a composite carbide, and a $Fe_3Mo_3N$ phase of a composite nitride are not present, and (c) in a case where lattice constants of the TiN and the Fe—Ni having an fcc structure are determined from the X-ray diffraction profile in the cross section of the TiN-based sintered body measured using the X-ray diffractometer, the lattice constant of the TiN is 4.235 to 4.245 Å, and the lattice constant of the Fe—Ni having an fcc structure is 3.58 to 3.62 Å.

(2) A cutting tool made of a TiN-based sintered body, in which at least a cutting edge of the cutting tool is formed of the TiN-based sintered body according to (1)."

Advantageous Effects of Invention

The TiN-based sintered body of the present invention has a sintered structure containing a TiN phase, a $Mo_2C$ phase, and a Fe—Ni phase with an fcc structure each having the predetermined area ratio, the content proportion of Ni and Fe forming the binder phase is set to the predetermined mass ratio, and furthermore, the lattice constants of TiN and Fe—Ni having an fcc structure are respectively set in the predetermined numerical value ranges. Therefore, the formation of a binder phase formed of Fe—Ni having a bcc structure or a hetero-phase formed of a composite carbide such as a $Fe_3Mo_3C$ phase, a composite nitride such as a $Fe_3Mo_3N$ phase, or the like in the sintered structure is prevented, and it is possible to enhance the toughness of the TiN-based sintered body to be approximately equivalent or superior to that of WC-based cemented carbides and to enhance the hardness of the TiN-based sintered body to be approximately equivalent or superior to that of TiCN-based cermets.

In addition, the cutting tool made of a TiN-based sintered body that is formed of the TiN-based sintered body of the present invention is excellent in terms of both toughness and hardness and thus exhibits excellent wear resistance and excellent cutting performance over long-term use while preventing the occurrence of abnormal damage such as chipping or fracturing even in the case of being used in the continuous cutting or intermittent cutting processes of carbon steel, alloy steel, and the like.

BRIEF DESCRIPTION OF THE DRAWING(S)

The FIGURE shows examples of X-ray diffraction profiles measured in the cross sections of TiN-based sintered bodies, the upper graph shows the X-ray diffraction profile of an invention TiN-based sintered body 1, and the lower graph shows the X-ray diffraction profile of a comparative example TiN-based sintered body 12.

DETAILED DESCRIPTION OF THE INVENTION

Hereinafter, a technical reason for determining the area ratio of each phase in the sintered structure of a TiN-based sintered body to a specific value, a technical reason for determining the content ratio of Ni and Fe forming a binder phase to a specific mass ratio, and a technical reason for determining the lattice constants of TiN and the binder phase to predetermined numerical value ranges will be described.

TiN Phase

When the amount of a TiN phase in a TiN-based sintered body is less than 70 area %, the hardness of the sintered body is not sufficient, and as a result, the wear resistance of a cutting tool made of the TiN-based sintered body (hereinafter, referred to as "TiN-based cutting tool") also degrades. On the other hand, when the TiN phase in the TiN-based sintered body exceeds 94 area %, fine voids (pores) are likely to be formed in the sintered microstructure, and thus the toughness degrades, and the chipping resistance and fracture resistance of the TiN-based cutting tool degrade.

Therefore, the amount of the TiN phase in the TiN-based sintered body is set to 70 to 94 area %.

In the present invention, the cross section of the TiN-based sintered body was observed with an electron scanning microscope (SEM) equipped with an energy dispersive X-ray analyzer (EDS), the amounts of elements contained in a region (for example, a 100 μm$^2$ region) in the obtained secondary electron image were measured, the TiN phase, a $Mo_2C$ phase, and a Fe—Ni phase having an fcc structure were specified, the area ratio of each phase in the region was calculated, the area ratio was calculated in at least a plurality of regions, which is five or more regions, and the average value of the area ratio was regarded as the area percentage of each phase.

Mo2C Phase

When the amount of the Mo2C phase in the TiN-based sintered body is less than 1 area %, the wettability between the TiN phase and a binder phase is insufficient, and voids are generated in the sintered microstructure. Therefore, the toughness degrades. On the other hand, when the amount of $Mo_2C$ phase exceeds 25 area %, a composite carbide such as a $Fe_3Mo_3C$ phase and a composite nitride such as a $Fe_3Mo_3N$ phase are likely to be formed, and the composite carbide and the composite nitride degrade the toughness. Therefore, the amount of the $Mo_2C$ phase in the TiN-based sintered body is determined to be 1 to 25 area %.

Binder Phase

When the amount of the binder phase in the TiN-based sintered body is less than 5 area %, the amount of the binder phase is small, and thus the toughness of the TiN-based sintered body degrades. On the other hand, when the amount of the binder phase exceeds 15 area %, the amount of the TiN phase, which is a hard phase component, relatively decreases, and thus the hardness decreases, and as a result, the wear resistance of the TiN-based cutting tool also degrades.

Therefore, the amount of the binder phase in the TiN-based sintered body is determined to be 5 to 15 area %.

In addition, in the present invention, when the content ratio of Ni with respect to the total amount of Fe and Ni forming the binder phase (=Ni/(Fe+Ni)×100) is determined to be 15 to 35 mass %, it is possible to further enhance the toughness and hardness of the TiN-based sintered body.

The reasons are as follows. In a case where the content ratio of Ni with respect to the total amount of Fe and Ni (=Ni/(Fe+Ni)×100) is less than 15 mass %, Ni forms solid solutions in Fe, but the effect of the solid solutions is not strong enough for strengthening of the binder phase, and thus the hardness of the binder phase is insufficient. In a case where the content ratio of Ni with respect to the total amount of Fe and Ni (=Ni/(Fe+Ni)×100) exceeds 35 mass %, an intermetallic compound $FeNi_3$ is likely to be generated, and thus the toughness of the binder phase degrades.

In a case where an X-ray diffraction profile is measured in the cross section of the TiN-based sintered body of the present invention using an X-ray diffractometer in a measurement range (2θ) of 25 to 115 degrees, as shown in FIG. 1, the presence of at least the diffraction peaks of TiN, $Mo_2C$, and Fe—Ni having an fcc structure is confirmed, but the presence of the diffraction peaks of Fe—Ni having a bcc structure and $Fe_3Mo_3C$ is not confirmed. The diffraction peaks were identified using JCPDS card, No. 00-088-1420 was used for TiN, No. 01-071-0242 was used for $Mo_2C$, No. 98-063-2933 was used for Fe—Ni having an fcc structure, No. 00-087-0474 was used for Fe—Ni having a bcc structure, and No. 00-047-1191 ($Fe_3Mo_3C$), No. 01-089-7952 ($Fe_3Mo_3N$), No. 01-089-2579 ($Fe_3W_3C$) were used for the double carbide and the double nitride.

From this fact, it is understood that, in the TiN-based sintered body of the present invention, a hetero-phase formed of a Fe—Ni phase having a bcc structure, a composite carbide such as a $Fe_3Mo_3C$ phase, or a composite nitride such as a $Fe_3Mo_3N$ phase, which degrades the toughness and hardness of the sintered body, is not formed.

The X-ray diffraction measurement can be carried out using a Cu-Kα ray (λ=1.5418 Å) as a radiation source under the conditions of a scan step of 0.013 degrees and a measurement time per step of 0.48 sec/step.

In addition, when an X-ray diffraction profile as shown in FIG. 1 is measured in the cross section of the TiN-based sintered body of the present invention in the same manner, and the lattice constants of TiN and Fe—Ni having an fcc structure are determined from the diffraction peaks thereof, the lattice constant of TiN is in a range of 4.235 to 4.245 Å, and the lattice constant of Fe—Ni having an fcc structure is in a range of 3.58 to 3.62 Å.

Here, when the lattice constant of TiN is less than 4.235 Å, Ti or N is released from the crystal lattice of TiN having an fcc structure, and an increase in defects in TiN particles degrades the toughness. In addition, when the lattice constant of TiN exceeds 4.245 Å, C is contained in the crystal lattice of TiN, and thus the toughness of TiN particles is impaired.

Therefore, the lattice constant of TiN needs to be in a range of 4.235 to 4.245 Å.

In addition, when the lattice constant of Fe—Ni having an fcc structure, which forms the binder phase, is less than 3.58 Å, the amount of C contained in the binder phase is small, and thus $Fe_3Mo_3C$ is likely to be generated, and the toughness of the TiN-based sintered body degrades. On the other hand, when the lattice constant of Fe—Ni having an fcc structure exceeds 3.62 Å, a hetero-phase of iron carbide such as cementite is likely to be generated, and the toughness degrades.

Therefore, the lattice constant of Fe—Ni having an fcc structure, which forms the binder phase, needs to be in a range of 3.58 to 3.62 Å.

Regarding the measurement of the lattice constant, the lattice constants can be respectively obtained from the value of 2θ where the diffraction peak of the (200) plane of TiN appears and the value of the 2θ where the diffraction peak of the (111) plane of Fe—Ni having an fcc structure appears by calculation based on Bragg's equation: $2d \sin θ = nλ$ (where d is the lattice spacing, θ is the Bragg angle, 2θ is the diffraction angle, λ is the wavelength of the incident X-ray, and n is an integer).

Production of TiN-Based Sintered Body of Present Invention

In the production of the TiN-based sintered body of the present invention, in order to obtain the component composition and the like of each phase described above, first, it is preferable to use, as raw material powders, raw material powders containing components of TiN: 55 to 92 mass %, Mo$_2$C: 1 to 40 mass %, Fe: 5 to 18 mass %, and Ni: 1 to 5 mass % and having a composition satisfying a relationship in which the mass percentage of Ni with respect to the total amount of Ni and Fe (=Ni×100/(Fe+Ni)) is 15 to 35 mass %.

In addition, the raw material powders satisfying the above-described condition are mixed together with a ball mill, and the mixed powders are press-formed to produce a green compact.

Then, the green compact is sintered in a temperature range of 1350° C. to 1450° C. for 30 to 120 minutes under the flow of a gas mixture having a hydrogen concentration of 1% to 3% and having a nitrogen concentration of 97% to 99% (nitrogen-diluted hydrogen atmosphere). After that, the atmosphere is switched to a vacuum atmosphere of $10^{-1}$ Pa, and the green compact is cooled to 1200° C. while being heated with a heater at a rate of 10° C./minute. Furthermore, the heating with the heater is stopped at 1200° C., and the green compact is naturally cooled to room temperature. As a result, the TiN-based sintered body of the present invention that is excellent in terms of both toughness and hardness can be produced.

The reason for sintering the green compact in the nitrogen-diluted hydrogen atmosphere is that, when the wettability between the TiN powder and Fe, which is the major component of the binder phase, is enhanced, the sinterability is enhanced at the same time.

In addition, after that, the TiN-based sintered body is machined into a predetermined shape, whereby a cutting tool made of the TiN-based sintered body that is excellent in terms of abnormal damage resistance against chipping and fracturing and wear resistance and exhibits excellent cutting performance over long-term use can be produced.

Next, examples of the present invention will be specifically described.

EXAMPLES

As powders for producing TiN-based sintered bodies, TiN powder having an average grain size of 10 μm, Mo$_2$C powder having an average grain size of 2 μm, Fe powder having an average grain size of 2 μm, and Ni powder having an average grain size of 1 μm were prepared, blended together to obtain blending ratios shown in Table 1, and blended together such that the amount of the Fe powder blended and the amount of the Ni powder blended satisfied blending percentages shown in Table 1, thereby preparing raw material powders 1 to 8. The average grain size mentioned herein means the median diameter (d50).

Next, the raw material powders 1 to 8 were loaded into a ball mill and mixed together to produce mixed powders 1 to 8. The mixed powders 1 to 8 were dried and then press-formed at a pressure of 100 to 500 MPa, thereby producing green compacts 1 to 8.

Next, these green compacts 1 to 8 were sintered under the conditions shown in Table 2, the atmosphere was switched to a vacuum atmosphere of $10^{-1}$ Pa, and the green compacts were cooled to 1200° C. while being heated with a heater at a rate of 10° C./min. Furthermore, the heating with the heater was stopped at 1200° C., and the green compacts were naturally cooled to room temperature, thereby producing TiN-based sintered bodies of the present invention (hereinafter referred to as "prevent invention sintered bodies") 1 to 8 shown in Table 3.

For comparison, a variety of powders each having an average grain size equivalent to those for present invention tools were blended together to obtain blending composition shown in Table 4, thereby preparing raw material powders 11 to 18. Next, the raw material powders 11 to 18 were loaded into the ball mill and mixed together to produce mixed powders 11 to 18. The mixed powders 11 to 18 were dried and then press-formed at a pressure of 100 to 500 MPa to produce green compacts 11 to 18.

Next, these green compacts 11 to 18 were sintered under the conditions shown in Table 2 and Table 5 and then cooled to room temperature, thereby producing sintered bodies of comparative examples shown in Table 6 (hereinafter, referred to as "comparative example sintered bodies") 11 to 18.

For reference, a WC-based cemented carbide sintered body was produced by the following method.

As raw material powders, WC powder and Co powder each having an average grain size of 0.5 to 1 μm were prepared. These raw material powders were blended together at a ratio of WC: 90 mass % and Co: 10 mass %, wet-mixed for 24 hours in the ball mill, and dried. After that, the mixture was press-formed to a green compact at a pressure of 100 MPa, and the green compact was sintered in a vacuum of 6 Pa under the conditions of a temperature of 1400° C. and a retention time of one hour, thereby forming the WC-based cemented carbide sintered body (hereinafter, simply referred to as "cemented carbide").

A WC-based cemented carbide sintered body 21 (hereinafter, referred to as "reference example sintered body 21") having a component composition of WC: 84 area % and Co: 16 area % was produced by the above-described method.

For additional reference, a TiCN-based cermet sintered body was produced by the following method.

As raw material powders, TiCN powder, Mo$_2$C powder, Co powder, and Ni powder each having an average grain size of 0.5 to 3 μm were prepared. These raw material powders were blended together at a ratio of TiCN: 75 mass %, Mo$_2$C: 10 mass %, Co: 7.5 mass %, and Ni: 7.5 mass %, wet-mixed for 24 hours in the ball mill, and dried. After that, the mixture was press-formed to a green compact at a pressure of 200 MPa, and the green compact was sintered in a vacuum of 6 Pa under the conditions of a temperature of 1450° C. and a retention time of one hour, thereby forming a TiCN-based cermet sintered body (hereinafter, simply referred to as "cermet").

A TiCN-based cermet sintered body 22 (hereinafter, referred to as "reference example sintered body 22") having a component composition of TiMoCN: 90 area % and Co+Ni: 10 area % was produced by the above-described method.

Next, the cross sections of the present invention sintered bodies 1 to 8 and the comparative example sintered bodies 11 to 18 were observed with an electron scanning microscope (SEM) equipped with an energy dispersive X-ray analyzer (EDS), the amounts of elements contained in a measurement region (for example, a 100 μm×100 pm measurement region) in the obtained secondary electron image were measured. A TiN phase, a Mo$_2$C phase, and a Fe—Ni phase having an fcc structure were specified, and the area ratio of each phase in the measurement region was calculated. The area ratio were calculated in five measurement regions, and the average value of these calculation values was obtained as the area percentage of each phase in the sintered microstructure.

In addition, regarding the Fe—Ni phase having an fcc structure, the Ni content and the Fe content in the phase were measured at 10 points on the Fe—Ni phase using an Auger electron spectrometer, and the content ratio of Ni with respect to the total amount of Fe and Ni (=Ni×100/(Fe+Ni)) was obtained from the average value of the obtained calculation values in terms of the mass percentage.

Table 3 and Table 6 show these values.

In addition, the X-ray diffraction profiles in the cross sections of the present invention sintered bodies 1 to 8 and the comparative example sintered bodies 11 to 18 were measured using an X-ray diffractometer in a measurement range (2θ) of 25 to 115 degrees, and a phase present in the sintered microstructure of each sintered body was confirmed.

The X-ray diffraction measurement was carried out using a Cu-Kα ray (λ=1.5418 Å) as a radiation source under the conditions of a scan step of 0.013 degrees and a measurement time per step of 0.48 sec/step. In addition, regarding the presence or absence of a peak, first, peaks were extracted from the obtained XRD profile using a commercially available XRD analysis software. Subsequently, from the individual extracted peaks, a peak having a count 3% or more higher than the background count around the peak was selected. For the selected peak, a peak was determined to be present, and, for other peaks, a peak was determined to be not present.

In addition, from the diffraction peaks of TiN and Fe—Ni having an fcc structure in the X-ray diffraction profiles measured in the cross sections of the present invention sintered bodies 1 to 8 and the comparative example sintered bodies 11 to 18, the lattice constants of TiN and Fe—Ni having an fcc structure were obtained.

The lattice constants were respectively obtained from the value of 2θ where the diffraction peak of the (200) plane of TiN appeared and the value of the 2θ where the diffraction peak of the (111) plane of Fe—Ni having an fcc structure appeared by calculation based on Bragg's equation: $2d \sin \theta = n\lambda$ (where d is the lattice spacing, θ is the Bragg angle, 2θ is the diffraction angle, λ is the wavelength of the incident X-ray, and n is an integer).

λ is 1.5418 Å as described above.

Table 3 and Table 6 show phases present in the sintered microstructures and the lattice constants of TiN and Fe—Ni having an fcc structure.

Next, for the present invention sintered bodies 1 to 8, the comparative example sintered bodies 11 to 18, and the reference example sintered bodies 21 and 22, the Vickers hardness HV (N/mm$^2$) was measured with a test force of 10 kg, and the average value of values measured at five points was obtained as the Vickers hardness HV (N/mm$^2$) of each sintered body.

In addition, as the index of the toughness of each sintered body, the length of an indentation (the length of the maximum diagonal line of the indentation) formed during the measurement of the Vickers hardness was measured, and the length of a crack (the length of the maximum crack) extended from the indentation was measured. The fracture toughness value (MPa·m$^{0.5}$) was obtained from Niihara et al.'s equation (refer to K. Niihara, R. Morena, and D. P. H Hasselman's "Evaluation of KIc of brittle solids by the indentation method with low crack-to-indent ratios", J Mater Sci Lett, 1, 13 (1982)), and the values obtained from five points were averaged to obtain the fracture toughness value of each sintered body.

It can be said that the more the average Vickers hardness (HV) increases, the more the hardness increases, and the more the fracture toughness increases, the more the toughness increases, in each sintered body.

Table 3 and Table 6 show these values.

According to Table 3 and Table 6, it is found that the present invention sintered bodies 1 to 8 had hardness that was almost comparable to the hardness of the reference example sintered body 22 (TiCN-based cermet sintered body) and toughness that was almost comparable to the toughness of the reference example sintered body 21 (WC-based cemented carbide sintered body).

TABLE 1

| Type of raw material powder | Blending composition (mass %) | | | | Blending ratio of Ni powder (mass %) Ni × 100/(Fe + Ni) |
|---|---|---|---|---|---|
| | TiN powder | Mo$_2$C powder | Fe powder | Ni powder | |
| 1 | 85.0 | 4.0 | 8.7 | 2.3 | 20.9 |
| 2 | 83.0 | 4.0 | 10.0 | 3.0 | 23.1 |
| 3 | 58.5 | 35.3 | 5.0 | 1.2 | 19.4 |
| 4 | 59.5 | 21.5 | 15.2 | 3.8 | 20.0 |
| 5 | 91.2 | 1.6 | 5.8 | 1.4 | 19.4 |
| 6 | 83.0 | 4.0 | 8.5 | 4.5 | 34.6 |
| 7 | 83.0 | 4.0 | 11.0 | 2.0 | 15.4 |
| 8 | 75.0 | 12.0 | 9.0 | 4.0 | 30.8 |

TABLE 2

| Sintering conditions | Sintering conditions | | | |
|---|---|---|---|---|
| | Sintering temperature (°C) | Sintering time (minute) | Hydrogen concentration (%) | Nitrogen concentration (%) |
| 1 | 1400 | 60 | 2 | 98 |
| 2 | 1450 | 30 | 1 | 99 |
| 3 | 1350 | 120 | 3 | 97 |
| 4 | 1400 | 90 | 3 | 97 |

TABLE 3

| Type of present invention sintered body | Type of sintering conditions | Component composition of sintered body (area %) | | | | X-ray diffraction profile | | | Vickers hardness (HV) | Fracture toughness value (MPa · m$^{0.5}$) |
|---|---|---|---|---|---|---|---|---|---|---|
| | | | | Binder phase | | Phase detected from diffraction peak | Lattice constant (Å) | | | |
| | | TiN | Mo$_2$C | Fe + Ni | Ni × 100/(Fe + Ni) | | TiN | Fe—Ni having fcc structure | | |
| 1 | 1 | 89.7 | 2.5 | 7.8 | 20.9 | TiN, Mo$_2$C, Fe—Ni (fcc) | 4.241 | 3.605 | 1585 | 11.5 |

TABLE 3-continued

| Type of present invention sintered body | Type of sintering conditions | Component composition of sintered body (area %) | | | | X-ray diffraction profile | | | Vickers hardness (HV) | Fracture toughness value (MPa·m^0.5) |
|---|---|---|---|---|---|---|---|---|---|---|
| | | | | Binder phase | | Phase detected from diffraction peak | Lattice constant (Å) | | | |
| | | TiN | Mo$_2$C | Fe + Ni | Ni × 100/(Fe + Ni) | | TiN | Fe—Ni having fcc structure | | |
| 2 | 2 | 88.2 | 2.5 | 9.3 | 23.1 | TiN, Mo$_2$C, Fe—Ni (fcc) | 4.238 | 3.588 | 1509 | 12.3 |
| 3 | 3 | 70.0 | 25.0 | 5.0 | 20.0 | TiN, Mo$_2$C, Fe—Ni (fcc) | 4.242 | 3.602 | 1627 | 10.2 |
| 4 | 4 | 70.0 | 15.0 | 15.0 | 20.0 | TiN, Mo$_2$C, Fe—Ni (fcc) | 4.245 | 3.606 | 1420 | 13.6 |
| 5 | 1 | 94.0 | 1.0 | 5.0 | 20.0 | TiN, Mo$_2$C, Fe—Ni (fcc) | 4.243 | 3.615 | 1650 | 9.5 |
| 6 | 2 | 88.3 | 2.5 | 9.2 | 34.6 | TiN, Mo$_2$C, Fe—Ni (fcc) | 4.235 | 3.580 | 1522 | 12.1 |
| 7 | 3 | 88.1 | 2.5 | 9.4 | 15.4 | TiN, Mo$_2$C, Fe—Ni (fcc) | 4.236 | 3.620 | 1493 | 12.6 |
| 8 | 4 | 82.7 | 7.8 | 9.5 | 30.8 | TiN, Mo$_2$C, Fe—Ni (fcc) | 4.240 | 3.584 | 1475 | 13.1 |

TABLE 4

| Type of raw material powder | Blending composition (mass %) | | | | |
|---|---|---|---|---|---|
| | TiN powder | Mo$_2$C powder | Fe powder | Ni powder | Blending ratio of Ni powder (mass %) Ni × 100/(Fe + Ni) |
| 11 | 85.0 | 4.0 | 6.5 | 4.5 | 40.9 |
| 12 | 87.0 | 0.0 | 10.0 | 3.0 | 23.1 |
| 13 | 52.0 | 40.0 | 6.0 | 2.0 | 25.0 |
| 14 | 70.0 | 2.0 | 20.0 | 8.0 | 28.6 |
| 15 | 94.0 | 2.0 | 3.0 | 1.0 | 25.0 |
| 16 | 83.0 | 4.0 | 9.5 | 3.5 | 26.9 |
| 17 | 83.0 | 4.0 | 12.0 | 1.0 | 7.7 |
| 18 | 80.0 | 10.0 | 8.0 | 2.0 | 20.0 |

TABLE 5

| Sintering conditions | Sintering temperature (°C.) | Sintering time (minute) | Hydrogen concentration (%) | Nitrogen concentration (%) |
|---|---|---|---|---|
| 11 | 1400 | 60 | 0 | 100 |
| 12 | 1500 | 60 | 2 | 98 |
| 13 | 1300 | 120 | 3 | 97 |
| 14 | 1400 | 90 | 10 | 90 |

TABLE 6

| Type of comparative example sintered body | Type of sintering conditions | Component composition of sintered body (area %) | | | | X-ray diffraction profile | | | Vickers hardness (HV) | Fracture toughness value (MPa·m^0.5) |
|---|---|---|---|---|---|---|---|---|---|---|
| | | | | Binder phase | | Phase detected from diffraction peak | Lattice constant (Å) | | | |
| | | TiN | Mo$_2$C | Fe + Ni | Ni × 100/(Fe + Ni) | | TiN | Fe—Ni having fcc structure | | |
| 11 | 1 | 89.9 | 2.5 | 7.6 | 40.9 | TiN, Mo$_2$C, Fe—Ni (fcc), FeNi$_3$ | 4.238 | 3.550 | 1561 | 7.2 |
| 12 | 2 | 90.9 | 0.0 | 9.1 | 23.1 | TiN, Fe-Ni(fcc, bcc) | 4.236 | 3.592 | 1357 | 10.3 |
| 13 | 3 | 64.2 | 29.2 | 6.6 | 25.0 | TiN, Mo$_2$C, Fr—Ni (fcc), Fe$_3$Mo$_3$N | 4.251 | 3.614 | 1430 | 9.5 |
| 14 | 4 | 77.9 | 1.3 | 20.8 | 28.6 | TiN, Mo$_2$C, Fe—Ni (fcc, bcc) | 4.242 | 3.603 | 1237 | 14.2 |
| 15 | 13 | 96.1 | 1.2 | 2.7 | 25.0 | TiN, Mo$_2$C, Fe—Ni (fcc, bcc) | 4.239 | 3.593 | 1573 | 6.1 |
| 16 | 12 | 88.2 | 2.5 | 9.2 | 26.9 | TiN, MO$_2$C, Fe—Ni (fcc, bcc), Fe$_3$Mo$_3$C | 4.229 | 3.597 | 1334 | 11.1 |
| 17 | 14 | 88.1 | 2.5 | 9.4 | 7.7 | TiN, MO$_2$C, Fe—Ni (fcc, bcc), Fe$_3$Mo$_3$C | 4.231 | 3.625 | 1486 | 8.7 |

TABLE 6-continued

| Type of comparative example sintered body | Type of sintering conditions | Component composition of sintered body (area %) | | | | Phase detected from diffraction peak | X-ray diffraction profile | | Vickers hardness (HV) | Fracture toughness value (MPa·m^0.5) |
|---|---|---|---|---|---|---|---|---|---|---|
| | | Binder phase | | | | | Lattice constant (Å) | | | |
| | | TiN | Mo₂C | Fe + Ni | Ni × 100/(Fe + Ni) | | TiN | Fe—Ni having fcc structure | | |
| 18 | 11 | 86.3 | 6.4 | 7.3 | 20.0 | TiN, MO₂C, Fe—Ni (fcc, bcc), Fe₃C | 4.242 | 3.584 | 1394 | 9.6 |
| Reference example sintered body 21 | | | | | | | | | 1532 | 12.0 |
| Reference example sintered body 22 | | | | | | | | | 1617 | 9.3 |

Next, a grinding process was carried out on the present invention sintered bodies 1 to 8, the comparative example sintered bodies 11 to 18, and the reference example sintered bodies 21 and 22 produced above, thereby producing cutting tools made of the present invention sintered bodies (hereinafter, referred to as "present invention tools") 1 to 8, cutting tools made of the comparative example sintered bodies (hereinafter, referred to as "comparative example tools") 11 to 18, and cutting tools made of the reference example sintered bodies (hereinafter referred to as "reference example tools") 21 and 22 each having an insert shape of ISO standard SEEN 1203AFSN.

A wet-type milling cutting process test of alloy steel, which will be described below, was carried out in a state in which each of the present invention tools 1 to 8, the comparative example tools 11 to 18, and the reference example tools 21 and 22 was screwed to the tip portion of a cutter made of tool steel with a fixing jig, the wear width of flank face of the cutting edge was measured, and the wear state of the cutting edge was observed.

Cutting Conditions

Work material: JIS SCM440 block,
Cutting speed: 150 m/min,
Cutting depth: 1.0 mm,
Feed: 0.38 mm/rev,
Cutting time: 11 minutes,
Table 7 shows the results of the cutting test.

TABLE 7

| Type | | Wear width of flank face (mm) | Wear state of cutting edge |
|---|---|---|---|
| Present invention tool | 1 | 0.10 | No abnormality |
| | 2 | 0.12 | No abnormality |
| | 3 | 0.09 | No abnormality |
| | 4 | 0.18 | No abnormality |
| | 5 | 0.08 | Mild chipping(Note) |
| | 6 | 0.11 | No abnormality |
| | 7 | 0.13 | No abnormality |
| | 8 | 0.14 | No abnormality |
| Comparative example tool | 11 | 0.25 | Chipping |
| | 12 | *5 | Fracturing |
| | 13 | *9 | Normal wear |
| | 14 | *7 | Heat crack |
| | 15 | *3 | Fracturing |
| | 16 | *3 | Fracturing |
| | 17 | *4 | Fracturing |
| | 18 | *5 | Fracturing |
| Reference example tool | 21 | 0.19 | No abnormality |
| | 22 | 0.14 | Chipping |

(Note)
The mild chipping in the present invention tool 5 was damage that did not affect the tool service life and did not cause any problems even when the present invention tool was further used for cutting after the present test.
*indicates the cutting time (minutes) elapsed until the service life ended.

As shown in Table 7, the present invention tools 1 to 8 of the present invention did not allow the occurrence of an abnormal damage such as fracturing, chipping, or the like that was serious enough to affect the cutting service lives, showed excellent wear resistance that was almost comparable to the wear resistance of the reference example tool 21, and exhibited excellent cutting performance over long-term use.

However, the comparative example tools 11 to 18 and the reference example tool 22 did not have sufficient toughness, and thus the tool service lives were short due to the occurrence of abnormal damage such as chipping and fracturing.

INDUSTRIAL APPLICABILITY

The TiN-based sintered body of the present invention is excellent in terms of both hardness and toughness and thus can be applied not only to cutting tools but also to tough members and wear-resistant members in a variety of technical fields. Particularly, in the case of being used as a cutting tool, the TiN-based sintered body exhibits excellent wear resistance and excellent abnormal resistance. Therefore, the cutting tool exhibits excellent cutting performance over long-term use and is capable of sufficiently satisfying the labor-saving, energy-saving, and furthermore, cost reduction of cutting processes.

What is claimed is:
1. A TiN-based sintered body comprising:
a sintered structure containing;
70 to 94 area % of a TiN phase,
1 to 25 area % of a Mo₂C phase, and a remainder being a binder phase, wherein
(a) of the binder phase consists essentially of Fe and Ni, a total area ratio of Fe and Ni is 5 to 15 area %, and a content ratio of Ni with respect to a total amount of Fe and Ni is 15 to 35 mass %,
(b) in a case where an X-ray diffraction profile is measured in a cross section of the TiN-based sintered body using an X-ray diffractometer, at least diffraction peaks of TiN, $Mo_2C$, and Fe-Ni having an fcc structure are present, but diffraction peaks of Fe-Ni having a bcc structure, a $Fe_3Mo_3C$ phase of a composite carbide, and a $Fe_3Mo_3N$ phase of a composite nitride are not present, and
(c) in a case where lattice constants of the TiN and the Fe-Ni having an fcc structure are determined from the X-ray diffraction profile in the cross section of the TiN-based sintered body measured using the X-ray diffractometer, the lattice constant of the TiN is 4.235 to 4.245 Å, and the lattice constant of the Fe-Ni having an fcc structure is 3.58 to 3.62 Å.

2. A cutting tool made of a TiN-based sintered body, wherein at least a cutting edge of the cutting tool is formed of the TiN-based sintered body according to claim 1.

* * * * *